United States Patent [19]

Marandici et al.

[11] Patent Number: 5,337,373
[45] Date of Patent: Aug. 9, 1994

[54] AUTOMATIC THRESHOLD GENERATION TECHNIQUE

[75] Inventors: Mircea P. Marandici, Poughkeepsie, N.Y.; Matthew J. Quinn, Seattle, Wash.

[73] Assignee: International Business Machines Corporation, Armonk, N.Y.

[21] Appl. No.: 100,637

[22] Filed: Jul. 30, 1993

Related U.S. Application Data

[63] Continuation of Ser. No. 783,453, Oct. 24, 1991, abandoned.

[51] Int. Cl.$^5$ .............................................. G06K 9/38
[52] U.S. Cl. ..................................... 382/51; 358/466
[58] Field of Search .................. 382/9, 18, 50, 51, 52, 382/53; 358/464, 465, 466

[56] References Cited

U.S. PATENT DOCUMENTS

| | | | |
|---|---|---|---|
| 3,944,977 | 3/1976 | Holmes | 340/146.3 |
| 4,064,484 | 12/1977 | Mese et al. | 340/146.3 |
| 4,442,544 | 4/1984 | Moreland et al. | 382/53 |
| 4,468,703 | 8/1984 | Fujiwara et al. | 340/146.3 |
| 4,468,704 | 8/1984 | Stoffel et al. | 382/52 |
| 4,593,325 | 6/1986 | Kannapell et al. | 382/50 |
| 4,656,665 | 4/1987 | Pennebaker | 382/18 |
| 4,710,822 | 12/1987 | Matsunawa | 382/51 |
| 4,742,556 | 5/1988 | Davis, Jr. et al. | 382/51 |
| 4,742,557 | 5/1988 | Ma | 382/51 |
| 4,907,286 | 3/1990 | Yamada | 382/51 |
| 4,977,605 | 12/1990 | Fardeau et al. | 382/51 |
| 5,075,872 | 12/1991 | Kumagai | 382/51 |
| 5,138,671 | 8/1992 | Yokoyama | 358/466 |
| 5,179,599 | 1/1993 | Formanek | 382/51 |

OTHER PUBLICATIONS

IBM Technical Disclosure Bulletins, vol. 15, No. 8, pp. 2595-2598 (two articles), Jan. 1973.
IBM Technical Disclosure Bulletin, vol. 18, No. 6, pp. 1962-1965, Nov. 1975.
IBM Technical Disclosure Bulletin, vol. 5, No. 6, pp. 55-56, Nov. 1962.
IBM Technical Disclosure Bulletin, vol. 22, No. 3, pp. 1031-1033, Aug. 1979.
IBM Technical Disclosure Bulletin, vol. 21, No. 7, pp. 3001-3003, Dec. 1978.
IBM Technical Disclosure Bulletin, vol. 15, No. 4, pp. 1138-1139, Sep. 1972.
Computer Science Press, "Algorithms for Graphics and Image Processing", Theo Pavlidis (cover sheet and page 66, only).

*Primary Examiner*—Michael T. Razavi
*Assistant Examiner*—David Fox
*Attorney, Agent, or Firm*—Whitham, Curtis & Whitham

[57] ABSTRACT

An estimate of a threshold value for feature extraction from image data containing noise and quantized into a plurality of quantization levels is made by filtering, such as recursively averaging n adjacent quantization levels and counting the extrema of the result. The recursive averaging is repeated with increasing values of n until only three extrema are present in the filtered data. The estimate of the threshold value is refined by comparing averages or summations of n quantization levels above and below the estimate and altering the estimated threshold value based on a comparison of the averages or summations. By basing both the estimation and refinement processes on the original data and using a value of n which is smaller in the refinement process than in the estimation process, a highly effective threshold value for the feature extraction process is obtained. Adaptive adjustment of n during the estimation process minimizes loss of data as well as computing time.

12 Claims, 5 Drawing Sheets

AUTOMATIC THRESHOLD GENERATION TECHNIQUE

This application is a continuation of U.S. patent application Ser. No. 07/783,453, abandoned, filed Oct. 24, 1991, priority of which is hereby claimed under 35 U.S.C. §120.

BACKGROUND OF THE INVENTION

1. Field of the Invention

The present invention generally relates to feature extraction and, more particularly, to automatic setting of a decision threshold in apparatus for bi-level image processing.

2. Description of the Prior Art

In the manufacture of electrical components or complete circuits of substantial complexity, testing of continuity or other electrical parameters has become an integral part of the manufacturing process. In circumstances where large numbers of such circuits or components are manufactured, it is common to automate the testing process which is carried out at one or more points during the manufacturing process. For this purpose, test probes will often be placed on a specially constructed test jig corresponding to the circuit or component to be tested.

As the size of electrical components and circuits has been reduced in the normal course of developing technology, the density of test points has been increased and the size of test points has been reduced. It is not uncommon for contact and connection points to be many times the size of circuit elements in very large scale integration (VLSI) circuits and the value of the "footprint" occupied by a test point has risen greatly. For this reason, also, it has been necessary to reduce the size of test points in electronic devices and circuits.

The reduction in size of test points requires extremely high accuracy in the construction of a test jig corresponding to the device or test probes of correspondingly small size and high uniformity. Such precision does not present a technical problem. However, in use, the test jig (or individual probes if a test jig is not used) must be positioned to a similar degree of accuracy in two coordinate directions and, possibly, rotation. This positioning accuracy is complicated by the fact that dimensional variations will exist from part to part and the positioning accuracy of the part itself must be accommodated. Further, the speed of automated manufacturing machinery and potential throughput capacities preclude manual positioning operations. Therefore, it is common to automate the positioning process and to use feature recognition techniques to control the positioning of test jigs and probes in automated testing apparatus.

Feature recognition basically involves the sensing of reflected or transmitted radiation, possibly in the visible spectrum, while scanning over an area and detecting contrast between adjacent locations. However, this process is often complicated by the radiation reflective or transmissive properties of the materials used in the fabrication of the device. Rather than sensing radiation levels which will unambiguously indicate the presence or absence of a feature, the radiation levels sensed will more typically constitute a grey scale of values which must be converted to binary values based on a decision threshold value. While contrast can often be enhanced somewhat by choice of radiation wavelength, the setting of a threshold for determination of whether or not a certain sensed level of radiation represents a feature is critical to the operation. Also, the process of feature recognition at high resolution is subject to noise, making the decision threshold level choice particularly critical.

The choice of decision threshold level (hereinafter simply threshold level) is also complicated by the fact that radiation transparency or reflectivity will often vary from part to part and from point to point within a feature (constituting noise) by an amount which is significant when compared to the desired threshold. This implies that a threshold should be established for each part tested. This also implies that the part to part threshold adjustment must be very accurate in order to properly discriminate data from noise. Manual adjustment is precluded for the same reasons that manual positioning of the test jig or probes is not feasible. In fact, in multi-level ceramic (MLC) structures, a positioning accuracy of 6 microns is required at a high rate of speed. In order to avoid limitation of throughput of manufacturing equipment for such devices, it is necessary to accurately carry out feature recognition at a rate of under two seconds per feature recognized. Therefore, to reliably carry out the feature recognition process, the optimization of decision threshold must be carried out in a very small fraction of that interval to allow time for the feature to be recognized from the sensed data and for the positioning of the test probes.

Many arrangements for providing adaptive circuits and automatic setting of threshold levels exist in the electrical arts, in general. However, a particularly difficult problem is encountered in feature recognition. Assuming the sensed signal is slightly greater than the noise, a characteristic histogram plot of frequency of occurrence against signal level will show two maxima, one of which is very high, with a slight minimum between the maxima. The maxima will, of course correspond to the radiation levels sensed for background and features at respective locations on the scanned area. It is common for the other maximum of such a histogram plot to have a very low level which is only slightly greater than the background noise level. The disproportionate height of the peaks of the histogram will vary with the relative areas corresponding to features and background. Since, in at least the area of electronic devices, the feature area will generally correspond to the amount of material used, such as gold, it follows that economy dictates minimization of feature area and the slightness of the minimum of the histogram referred to above relative to the peak corresponding to features is extremely common and noise will be of a comparable level to the smaller maximum in virtually all instances.

While the above difficulties of feature recognition are particularly critical in supporting automated testing applications, feature recognition is often applied to numerous manufacturing processes requiring determination of the precise location of a structure, such as automatic assembly of components and many applications involving servomechanisms and robotics. Accordingly, the ability to optimize a decision threshold is necessary to efficient and accurate operation of a wide range of processes, including motion detection, low-light vision arrangements, medical imaging, land mass mapping, facsimile and copier machines where enhancement of contrast of a spatial image may improve the sensitivity or performance of the process. In view of the variation of noise levels, and the levels of radiation sensed from background and feature areas during feature recognition, it is desirable that threshold levels be adaptively set.

SUMMARY OF THE INVENTION

It is therefore an object of the present invention to provide a method of rapidly optimizing of the decision threshold for conversion of grey scale data to binary data.

It is another object of the invention to provide a method and apparatus capable of optimally segregating pixels representing a part of a feature of interest from a background signal level for a wide class of images.

In order to accomplish the above and other objects of the invention, a method of feature extraction is provided including the steps of a.) summing a portion of data falling within a predetermined number of said quantized ranges below a given signal level, b.) summing a portion of data falling within a predetermined number of said quantized ranges above a given signal level, c.) comparing results of steps a.) and b.) to provide one of a first and a second comparison result, d.) altering said given signal level in response to a first comparison result, e.) repeating steps a.) through d.) in response to the first comparison result and f.) outputting the given signal level, as altered, in response to a second comparison result.

In accordance with another aspect of the invention, a surface inspection method is provided including the steps of estimating a quantization level having a minimum number of points yielding data within that quantization level between two quantization levels having a greater number of points yielding data within corresponding respective quantization levels, and refining the estimated quantization level by summing the counts of a predetermined number of quantization levels adjacent and below the estimated quantization level to derive a first sum, summing the counts of a predetermined number of quantization levels equal in number to said predetermined number, adjacent and above said estimated quantization level, comparing the first sum and the second sum and adjusting the estimated quantization level in response to the result of said comparison to provide a refined quantization level.

In accordance with a further aspect of the invention, a method is provided including estimation by averaging counts of each of a predetermined number of quantization levels adjacent each quantization level and in which the predetermined number of quantization levels averaged exceeds the predetermined number of quantization levels summed during refinement of the estimation.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
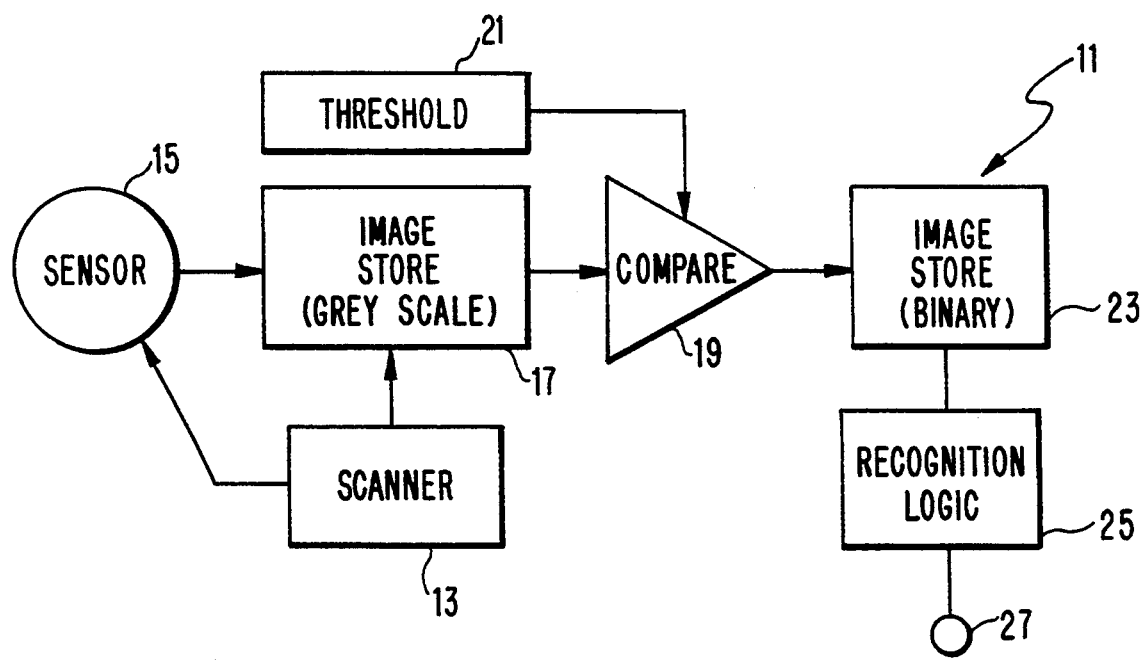
FIG. 1 is a block diagram of a typical feature extraction arrangement.

Referring now to the drawings, and more particularly to FIG. 1, there is shown a schematic diagram of the basic elements of a feature recognition or extraction system 11. Some arrangement such as scanner 13 will usually be included to provide for sensing of discrete, spatially differentiated areas by means of sensor 15. Scanner 13 could be either electronic or optical or a combination of both. A grey scale image memory 17 may be provided to store the output of the sensor for further processing and will usually be commonly controlled by the scanner 13 so that addresses in memory will correspond to locations at which radiation was sensed by sensor 15.

In order to achieve efficient feature extraction, the grey scale data from scanner 15, is often converted to binary form. This is typically done by comparing the signal from sensor 15 with a predetermined threshold level in order to differentiate between levels which are to be characterized as "1" and levels which are to be characterized as "0". This is done by comparator 19, in response to a threshold or reference signal generator 21. The results of the comparison are then typically stored in a binary memory 23 and later retrieved and processed by some recognition logic 25 to provide output 27 which may then be used for control of a machine, such as robotic positioning apparatus or a data input device.

It is to be understood that the recognition logic may be very simple, such a spatial filter to establish a minimum feature size in facsimile machines, or very complex, such as character recognition apparatus. The recognition logic could be omitted altogether, such as in copying machines. If the recognition logic for a particular application is sufficiently simple to perform in real time and over a limited area, memories 17 and 21 can be simple buffers or delays and, in some circumstances, can also be omitted. Therefore, the crucial element in any feature extraction system is the bi-modal quantization on which any contrast enhancing process depends.

Figure 2:
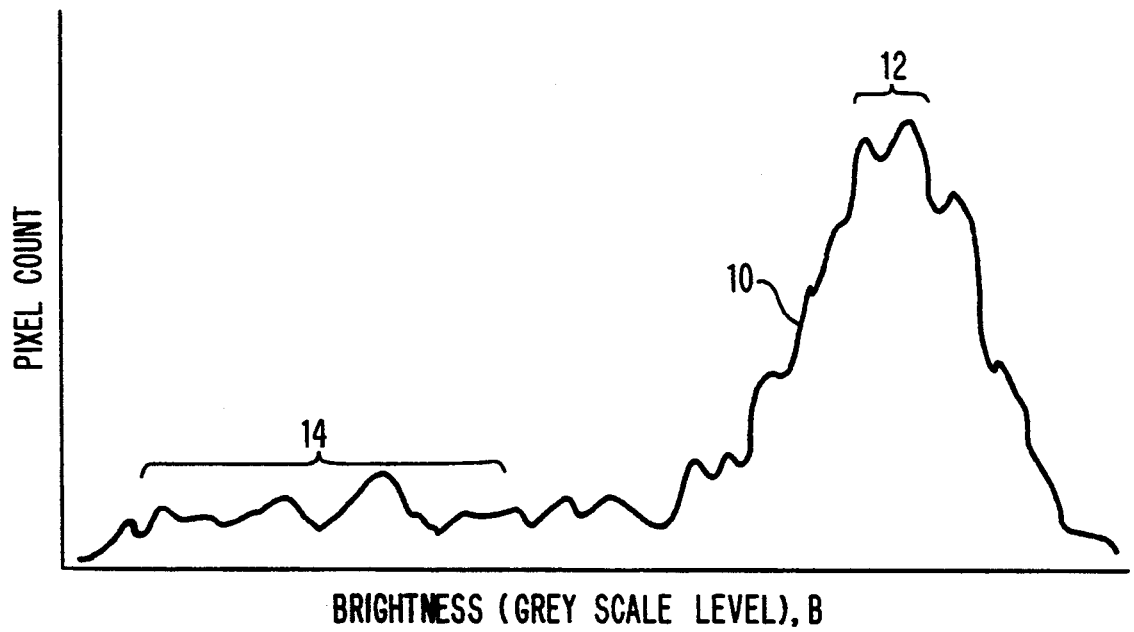
FIG. 2 is a histogram of typical values of sensed radiation levels including noise in a feature recognition process and a curve fitted thereto.

In FIG. 2, a histogram of typical values derived by scanning of an electronic circuit board is shown. In this histogram, also shown in FIG. 3 and, at increased size in FIG. 5, sensed, discrete brightness levels are indicated by horizontal position and frequency of occurrence of each discrete level is indicated by the vertical position of the line 10. One peak, generally indicated at 12, to the right is evident and corresponds to a distribution of reflectivities of points within the background of the electrical circuit. While the exact brightness corresponding to this peak is somewhat ambiguous, it is, nevertheless confined within a relatively small range of possible values. It should also be understood that this peak could also correspond to features such as conductors or test pad areas, but this will not usually be the case in electronic circuits for reasons of economy, as noted above.

In viewing the histogram of FIG. 2, there is also some suggestion of a second peak to the left and generally indicated at 14. In this case, since the peak is very small (as is particularly typical of electrical circuits), it is almost entirely obscured by noise. The brightness level corresponding to the peak could be found to fall anywhere within the range indicated by bracket 14 due to the masking effect of noise within the sensed signal.

If a threshold level is set at any particular level, locations from which that radiation level is sensed are regarded as uncertain for purposes of quantization to binary or bi-modal values. Uncertainty decreases with variation in sensed radiation from that threshold level. Since the goal of separation of desired data from a noisy signal on a statistical basis is to minimize the number of uncertain data items such as pixels (e.g. scanned locations) the optimum threshold level is at a level where the aggregate uncertainty of all data points is minimized. This will occur at the level corresponding to the minimum between the two peaks.

Automatic evaluation of this minimum is a non-trivial problem, as indicated in *Algorithms for Graphics and Image Processing*, by Theo Pavlidis (Bell Laboratories), Published by Computer Science Press, at page 66. It is not always possible to select a threshold value in advance because of difference in average brightness. For instance, the minimum cannot be approximated by interpolation between the brightness levels corresponding to the peaks because of the uncertainty of the brightness level which corresponds to the lower peak. Even if average brightness is measured over the entire area, the result may differ from the optimum threshold because of skewing of the histogram due to extreme transparency or reflectivity of either the features or background. Numerical analysis of the histogram is also skewed because of the disparity between the heights of the histogram peaks. This is also true of known filtering techniques, per se, such as recursive averaging of pixel counts at consecutive brightness levels which will be skewed in the direction of the smaller peak by an amount which increases with the disparity of the pixel counts at each peak. Because of the difficulty of analysis of histograms of numbers of data counts at each of a plurality of quantization levels or ranges in histograms exhibiting two disparate histogram peaks, a priori information to guide bi-modal discrimination of data, as pointed out above, may not be available or reliable in view of part to part variations in reflectivity or transparency.

Figure 3:
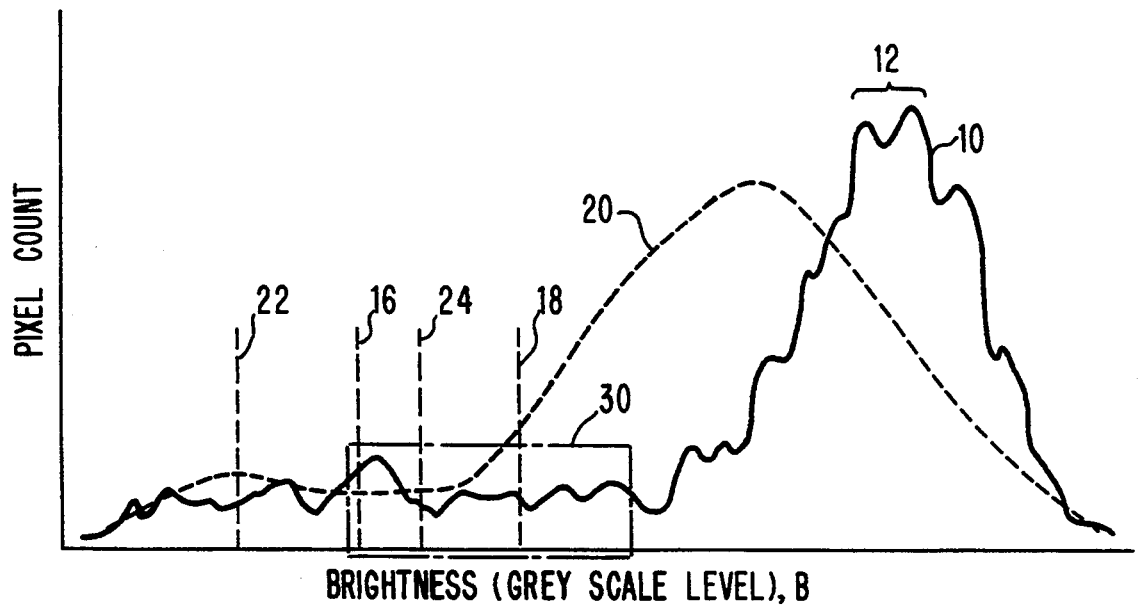
FIG. 3 is an exemplary histogram of grey scale values as sensed and as processed in accordance with the invention.

Referring now to FIG. 3, curve 10 of FIG. 2 is precisely repeated. The actual value of the lower peak for curve 10 of FIG. 2 is shown by dotted line 16. The actual minimum of curve 10 is indicated at dotted line 18. Neither of these points falls at local maxima or minima of curve 10. If noise is removed by filtering in accordance with a known recursive averaging technique, the result would be similar to dashed curve 20. Recursive averaging consists of choosing a value of n points of curve 10 to be averaged and deriving new values for curve 20 by averaging m-n overlapping groups of data points, where m is the number of brightness levels represented in curve 10. That is, a first point on curve 20 will be found by averaging points 1 to n of curve 10: a second point on curve 20 will be found by averaging points 2 to (n+1); a third, by averaging points 3 to (n+2) and so on. Depending on the number of data points (e.g. brightness levels) averaged together, the peaks of curve 20 will be broadened and shifted to the left. Additional leftward shifting of curve 20, relative to curve 10, will also occur in a manner generally proportional to the imbalance between the peaks. The lower maximum of curve 20 is indicated at 22 and the minimum between the peaks of curve 20 is indicated at 24. The leftward shifting of these two points relative to corresponding points relative to corresponding points 16 and 18, respectively, is evident. Similar results would occur for other known filtering techniques. As indicated, skewing due to filtering may be sufficiently great to cause point 24, corresponding to desired threshold point 18, to closely approach the value of the lower maximum 16 of curve 10. Since the skewing of the curve has two components, only one of which behaves in a predictable and therefore potentially correctable manner with n, the data is rendered unusable for approximating the minimum of the original data by the very technique that allowed extraction of the data from the noise in the signal. In other words, sufficient data is extracted for determining the quality of the image (e.g. to resolve two peaks among the data points of curve 10) but data concerning the location of those peaks is lost.

Figure 4:
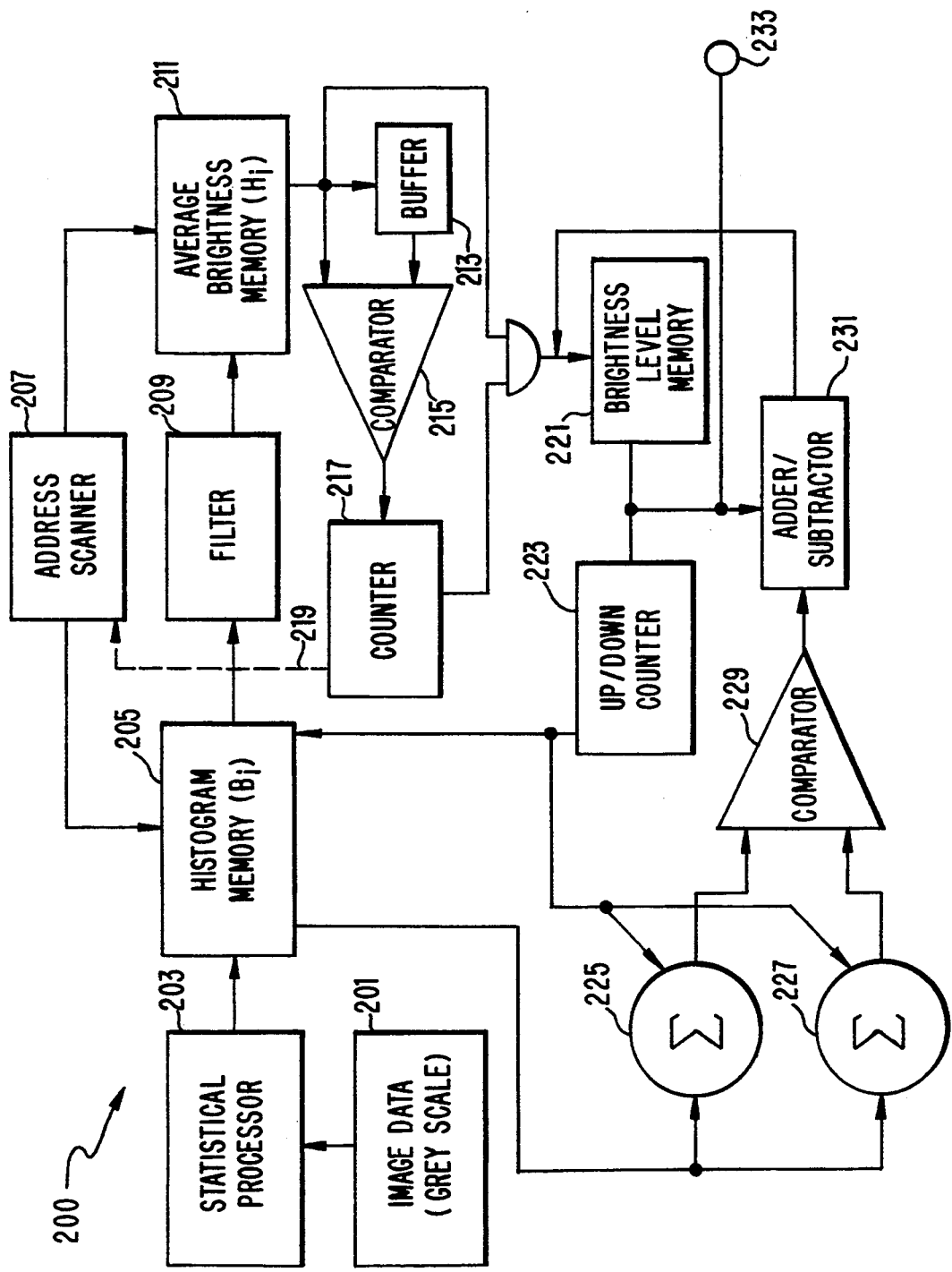
FIG. 4 is a schematic illustration of the invention.

The invention 200, as shown in schematic form in FIG. 4, utilizes the filtration technique similar to that described above but allows for minimization of skewing and loss of data by adaptively setting n as well as recovery of the lost data by recognizing that both components of the skewing of curve 20 are related to the value of n used during filtration. Specifically, after grey scale data is obtained from sensor or memory 201 and processed by statistical processor 203 and the results stored in histogram memory 205, the data is filtered by filter 209 and filtered brightness values are stored in average brightness memory 211 in locations corresponding to locations in memory 205, under control of address scanner 207. The filtration is made adaptive by beginning at an arbitrary or empirically determined small value of n, performing the filtration as described above, and then evaluating the curve 20, by means of a buffer 213, comparator 215 and counter 217 to determine the number of extrema (e.g. the total number of maxima and minima). If, on the first filtration, less than three extrema are found, the original image lacks sufficient average contrast relative to the noise level for analysis and feature extraction. Average contrast, in such a case, can usually be increased only by alteration of the optical system or, in a new part, by increasing the total area of the features therein. If more than three extrema result, n is insufficiently large to provide adequate filtration of noise.

According to the invention, if more than three extrema are found, the filtering process is repeated under control of counter 217, as indicated by dashed line 219, one or more times with sequentially increased values of n until precisely three extrema are present. In this way, the skewing of curve 20 is adaptively held to a minimum, insuring that point 24, the minimum of curve 20, will lie to the right of point 16 of FIG. 3 and that the estimated minimum will lie between the lower maximum and minimum of curve 10.

Figure 5:
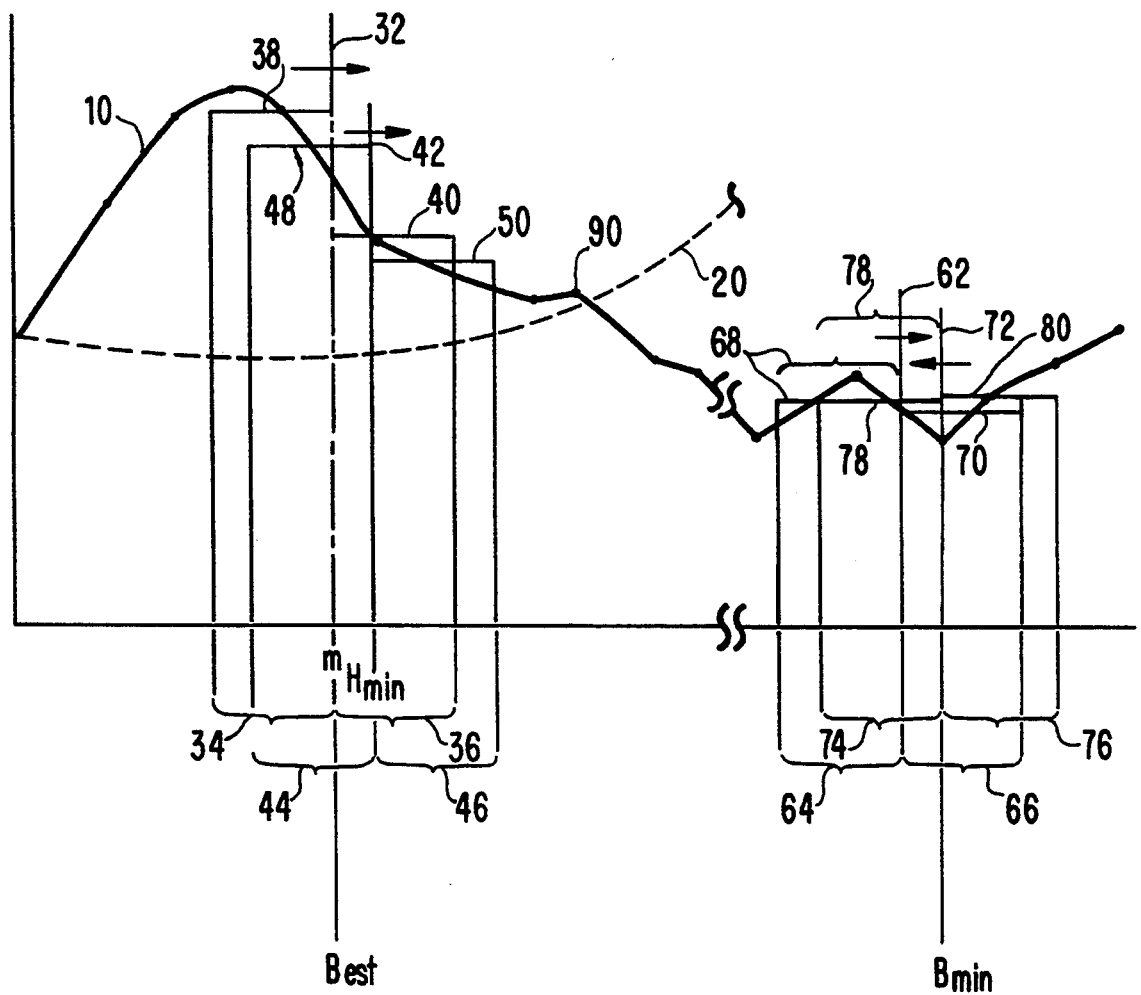
FIG. 5 is a graphical representation of a portion of the operation of the invention.

The location of the minimum on curve 10 is merely estimated by the minimum of curve 20 and entered into brightness level memory 221 under control of counter 217 when precisely three extrema are found. With reference to FIG. 5, corresponding to an enlarged view of the contents of the box 30 drawn in chain line in FIG. 3, the invention provides for further processing of the data of curve 10 with a reduced value of n. The refinement of the estimation provided by the further processing according to the invention essentially minimizes the number of image pixels affected by any uncertainty in the calculation of the bi-level threshold.

Specifically, beginning at a brightness value $m_{Hmin}$, indicated by chain line 32, an average of the pixel count for n values on either side 34, 36 of $m_{Hmin}$ is calculated from values in histogram memory 205 under control of an up/down counter or other addressing means 223 which increments and decrements the center address stored in memory 221. A refined value of m is found by incrementing or decrementing m with adder/subtractor 231 in the direction of the lower of the two averages 38, 40, calculated at 225 and 227 and detected by comparator 229. In this case, since average brightness value 40 is less than average brightness value 38, m is incremented and the estimated value 32 is shifted to the right to 42 and the process repeated by calculating averages 48 and 50 corresponding to ranges of m 44 and 46, comparing these ranges and shifting the refined value to the right in the direction indicated.

This process is continually repeated until a change of direction of shift is required, as determined by comparator 229. Such further repetitions are omitted from FIG. 5 in the interest of clarity and FIG. 5 has been reduced in horizontal extent as shown at section marks in the baseline and curve 10.

The right side of FIG. 5 depicts a repetition of the same process when the minimum of curve 10 is reached. In this case, the summations over ranges 64 and 66 indicate that a further shift to the right should occur and m should be incremented, based on a comparison of 68 and 70. As indicated by a bracket, reference numeral 68 corresponds to the leftmost three segments of a horizontal line indicating the average of that three value of m. Reference numeral 78 corresponds to the rightmost three segments of the same line which, coincidentally, has the same average value.

However, when m is incremented and the process repeated over ranges 74 and 76, a comparison of values 78 and 80 indicates a decrementing of m should be carried out. Thus, it is determined that the minimum of curve 10 has been reached. At this point, several other tests can be carried out in the termination of the process in order to ascertain that a true minimum value has been obtained and that the threshold will be set to the desired value, as will be discussed in greater detail below with reference to FIG. 6.

An analogy to this methodology would be that of a ball rolling down an incline between two hills and coming to rest at the minimum between them. However, the ability to set the value of n effectively allows the diameter of the ball to be changed so that local maxima, such as point 90, attributable to noise will not cause the process to terminate before the lowest point is reached. While n could be dynamically changed during this refinement process to test the size of any local maxima causing the process to terminate, this has not been found to be necessary, in practice. On the contrary, an empirically determined value of n between 3 and 7 generally produces good results. Lower values of n, within this range are preferred due to the reduction in computing time and n=3 is usually sufficient for resolving the minimum during pattern extraction from electronic circuit components. In comparison, for the filtering used in the estimation process described above, a starting value of n=6 is used which is usually incremented to a value of between 10 and 20 before a curve 20 with precisely three extrema is developed in the course of the adaptive estimation process.

Figure 6:
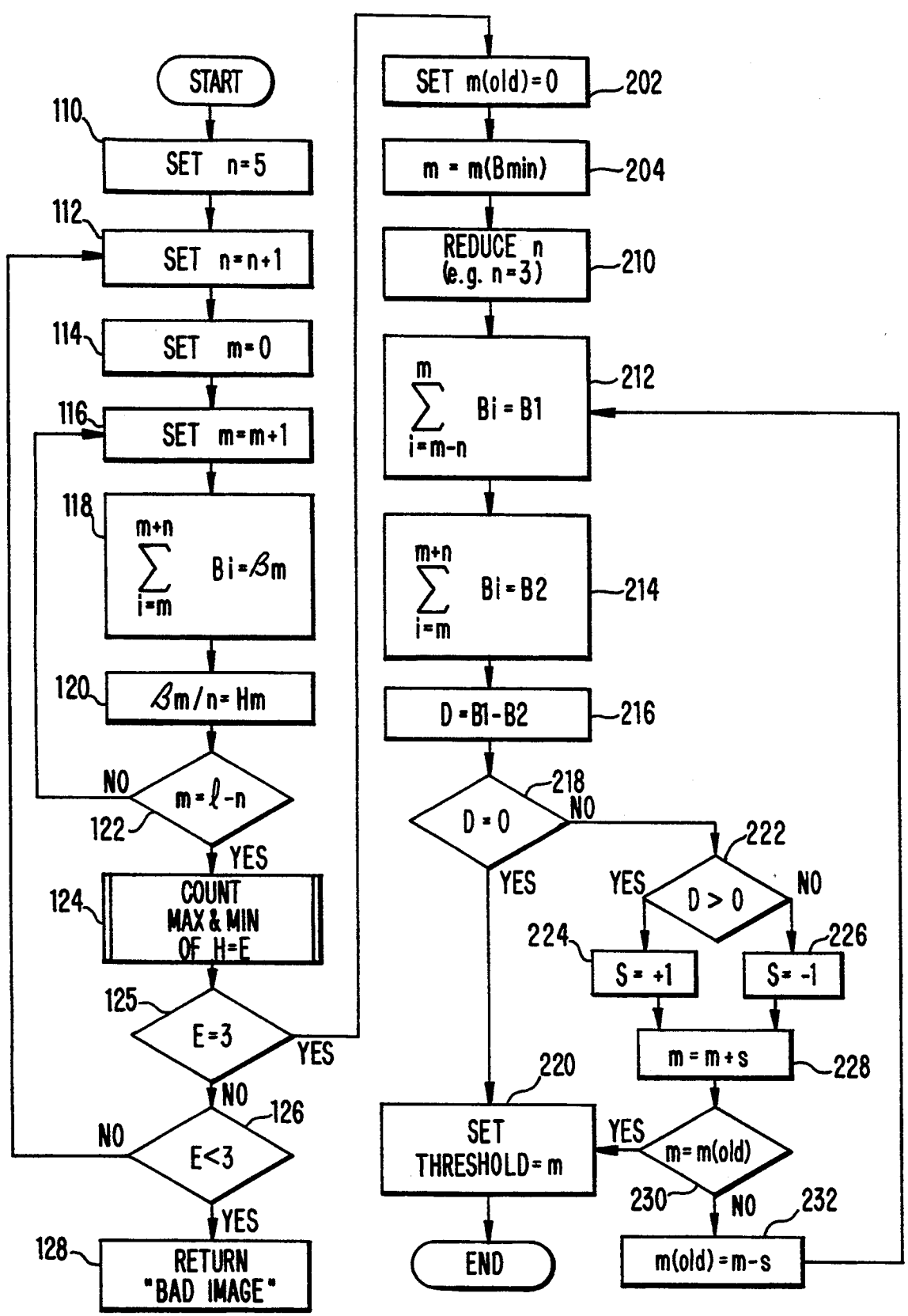
FIG. 6 is a flow chart illustrating the method of operation of the invention.

Referring now to FIG. 6, the methodology according to the preferred embodiment of the present invention will be described in greater detail. It may be helpful to observe, at the outset, that steps 110 through 128, on the left side of FIG. 6 correspond to the estimation process and steps 204 through 232 correspond to the refinement process. It is also to be understood that while the process of estimation is useful in accommodating part to part variations in optical characteristics and initial pattern evaluation, a priori data, if available and reliable, may be used at step 204 and the estimation process otherwise omitted altogether. In this case, the most recently obtained is used to scale the estimation to the current grey level range.

As the analysis is begun, n is set to 5 at 110 and incremented to a starting value of 6, as noted above, at 112. Similarly, m is set to 0 at 114 and incremented to a starting value of 1 at 116. Alternatively, the incrementing step could be performed in the process of respective ones of nested loops which will be described below and n and m directly set to desired initial values. An average of the first n values is computed by summing the first n brightness values, $B_i$, at 118 and dividing the result, $\beta_1$, by n to yield a first average brightness value, $H_1$, which is stored. The need to calculate additional overlapping ranges is determined by evaluating m to determine if $m=1-n$, where E is the number of discrete brightness levels resolved by the optical system and included in the data of curve 10. If additional data points must be generated, the process loops back to step 116 where m is incremented and the process repeated to calculate further values of $\beta_m$, $\beta_m$ and $H_m$ for each integral value of m. When the criterion of step 122 is met, values of H are evaluated 124, preferably by a subroutine scanning through the values of H and comparing adjacent values in pairs and incrementing a variable E, each time a local maximum or minimum is encountered. If the number of extrema, E, is found to be less than 3, the image is deemed to lack sufficient contrast for analysis and a "bad image" message or the like is returned at 128.

If E is more than 3, the noise has been insufficiently filtered from the signal. Therefore, it is necessary to average the signal over a greater number of data points. Accordingly, after branching at 126, n is incremented and the averaging process is repeated. When the number of extrema, E, is found to be equal to 3, at 125, m is set to the data point number where H exhibits a minimum. It should be noted that, since E=3, there can be only one such point, $m_{Hmin}$. This establishes the minimum of curve 20, point 24, as an approximation of point 18 on curve 10 for further refinement by the remainder of the process according to the invention.

The refinement portion of the process begins with steps 202 which sets a low dummy value for the variable m(old), 204 which sets the starting value of m to the estimated minimum, $m_{Hmin}$ and 210 in which n is set to a lower value, usually between 3 and 7 which is preferably empirically determined, as discussed above. Two summations are calculated 212 and 214 for adjacent ranges of m, each n data points wide. It should be noted that while the procedure was described in terms of averages in regard to FIG. 5, the summation results, $\beta_1$ and $\beta_2$, need only be compared by subtraction as indicated at step 216 to determine the sign of variable D. Therefore division by n of each summation, calculated at 225 and 227, is unnecessary.

The remainder of the process to determine the minimum of the original data is preferably carried out by first determining if D=0. If so, the threshold is immediately set to m at 220 and the process is complete. This will seldom be the case because of the shifting of curve 10 during the estimation process, as described above. It is, of course, possible that noise in the data could cause this to occur at some brightness level below the minimum of curve 10. However, in practice, it has been found that this possibility is so remote as to fail to justify testing the minimum with a different value of n which would have the effect of filtering the noise somewhat more strongly.

If D is not equal to 0, D is tested at 222 to determine if the difference between B1 and B2 is greater than zero. If so, the minimum has not been reached. S is then set to +1 at 224 and m is set to m+S at 228. This new value of m is tested at 230 to determine if the summations done at 212, 214 have previously been done for that value of m. On the first iteration of this process, of course, m(old) will have been set to 0 at 202 so that this test can be performed. Thus, m(old) will not be equal to m+S (the next value of m) if the minimum has not been reached and S has been set to +1 or a larger positive integer. In this case, m(old) is set to the previous value of m at 232 by subtracting S and the process is repeated beginning at summation 212 with an incremented value of m (=m+S). When the value of D is less than 0, S is set to −1 at 226 to decrement the new value of m at 228 and this value of m is tested against m(old) and, if the two values are equal, the threshold is set to m at 220 and the process is complete.

It should be noted that the process of determining this minimum can be expedited by setting S to some positive integral value greater than +1 at 224 and then adjusting the value downwardly to +1 upon a branch to 232 after a branch to 226 first occurs, allowing a second pass across the minimum at finer resolution. By the same token, n could alternatively or additionally be incremented to provide a second pass across the possible minimum with stronger filtering. However, in practice, this latter alternative has not been found necessary, as indicated above, even though the amount of computational time would be greatly reduced relative to a repetition of the entire process with an increased value of n since the summations 212, 214 would only be done fewer times at the increased value of n.

In view of the above, it is seen that by providing a process which will refine an initial estimation of a minimum in a histogram exhibiting two peaks, a process and apparatus have been provided which will refine a decision threshold value for removing noise from a histogram of spatially variable data to allow optimum extraction of features represented by one of two histogram peaks.

While the invention has been described in terms of a single preferred embodiment, those skilled in the art will recognize that the invention can be practiced with modification within the spirit and scope of the appended claims.

Having thus described my invention, what we claim as new and desire to secure by Letters Patent is as follows:

1. A method of optically imaging a sample and extraction of a feature of said sample from optical intensity data, including noise, in histogram form, produced by an optical inspection apparatus, said optical intensity data representing the number of times a signal level produced by said optical imaging and corresponding to a physical property of said sample at a spatially differentiated location thereon falls within each of a plurality of optical intensity quantization ranges, said feature extraction method including the steps of a.) filtering said optical intensity data over a given number of said plurality of quantization ranges to provide filtered data, b.) evaluating said filtered data to determine the number of extrema existing in said filtered data, c.) increasing said given number and repeating steps a.) and b.), d.) detecting and outputting a minimum value of said filtered data when a predetermined number of extrema are found in step b.), e.) estimating a threshold value for discrimination between values of said sensed signal level in accordance with said minimum value of said filtered data, f.) defining an estimate of said threshold value, g.) discriminating at least one feature on said sample in accordance with said threshold value, and h.) controlling relative positioning of said sample and apparatus for conducting processing of said sample in accordance with said at least one feature.

2. A surface inspection method as recited in claim 1 wherein said estimating step includes the further step of filtering noise from said quantization level counts.

3. A surface inspection method as recited in claim 2 wherein said filtering step includes the further step of averaging said number of counts in each of a number of quantization levels adjacent to each said quantization level to produce a plurality of averaged quantization level counts.

4. A surface inspection method as recited in claim 3 wherein said averaging step is repeated with an increased number of quantization levels.

5. A surface inspection method as recited in claim 4 wherein said averaging step is again repeated with a further increased number of quantization levels until said plurality of averaged quantization level counts exhibits exactly three extrema.

6. A surface inspection method as recited in claim 7 wherein said further increased number of quantization levels in said averaging step is greater than said predetermined number of quantization levels in said summing steps.

7. A surface inspection method as recited in claim 5 wherein said number of quantization levels in said averaging step is greater than said predetermined number of quantization levels in said summing steps.

8. A method of processing a sample including optical imaging of a sample and extraction of a feature of said sample from optical intensity data, including noise, in histogram form, said optical intensity data representing the number of times a sensed signal level produced by said optical imaging and corresponding to a physical property of said sample at a spatially differentiated location thereon falls within each of a plurality of quantization ranges, said feature extraction method including the steps of a.) summing a portion of said optical intensity data falling within a predetermined number of said quantized ranges below a given signal level, b.) summing a portion of said optical intensity data falling within a predetermined number of said quantized ranges above a given signal level, said predetermined number of said quantized ranges above a given signal level being equal to said predetermined number of said quantized ranges below a given signal level, c.) comparing results of steps a.) and b.) to provide one of a first and a second comparison result, d.) altering said given signal level in response to a first comparison result, e.) repeating steps a.) through d.) in response to said first comparison result, f.) outputting said given signal level, as altered, in response to a second comparison result, g.) discriminating values of said sensed signal level in response to said given signal level, as altered, to extract at least one feature therefrom, and h.) controlling relative positioning of said sample and apparatus for conducting processing of said sample in accordance with said at least one feature.

9. A method as recited in claim 8, wherein said sample is a substrate having electrical connections thereon, said at least one feature includes a test pad and said apparatus is a test probe.

10. A method as recited in claim 8, including the further step of estimating a minimum intensity level between two intensity level maxima in said optical intensity data.

11. A method as recited in claim 10, wherein said estimating step comprises aa.) filtering said data over a first given number of said plurality of quantization ranges to provide filtered data, bb.) evaluating said filtered data to determine the number of extrema existing in said filtered data, cc.) increasing said first given number and repeating steps aa.) and bb.), dd.) detecting and outputting a minimum value of said filtered data when a predetermined number of extrema are found in step bb.).

12. A method as recited in claim 11, wherein said sample is a substrate having electrical connections thereon, said at least one feature includes a test pad and said apparatus is a test probe.

* * * * *